(12) United States Patent
Sato et al.

(10) Patent No.: US 7,027,771 B1
(45) Date of Patent: Apr. 11, 2006

(54) MOBILE COMMUNICATION APPARATUS

(75) Inventors: Jun Sato, Kawasaki (JP); Nobuhiro Fujimoto, Ebina (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/522,684

(22) Filed: Mar. 10, 2000

(30) Foreign Application Priority Data

Mar. 30, 1999 (JP) .................... 11-90140

(51) Int. Cl.
*H04B 7/24* (2006.01)
*G08G 1/00* (2006.01)

(52) U.S. Cl. .............. 455/39; 455/11.1; 455/414; 455/414.2; 455/456.1; 340/901; 340/902; 340/903

(58) Field of Classification Search .......... 455/426, 455/420, 454, 556, 414, 462, 11.1, 426.1, 455/426.2, 414.1, 414.2, 414.3; 340/901, 340/902, 903
See application file for complete search history.

(56) References Cited

U.S. PATENT DOCUMENTS

| | | | | | |
|---|---|---|---|---|---|
| 4,954,829 | A | * | 9/1990 | Fiden | 342/60 |
| 5,311,570 | A | * | 5/1994 | Grimes et al. | 340/7.21 |
| 5,781,119 | A | * | 7/1998 | Yamashita et al. | 340/903 |
| 5,802,460 | A | * | 9/1998 | Parvulescu et al. | 455/419 |
| 5,847,661 | A | * | 12/1998 | Ricci | 340/10.41 |
| 6,052,632 | A | * | 4/2000 | Iihoshi et al. | 701/36 |
| 6,054,936 | A | * | 4/2000 | Yamagata et al. | 340/903 |
| 6,150,931 | A | * | 11/2000 | Yamagata et al. | 340/435 |
| 6,205,332 | B1 | * | 3/2001 | Novel | 455/420 |
| 6,252,883 | B1 | * | 6/2001 | Schweickart et al. | 370/342 |
| 6,295,448 | B1 | * | 9/2001 | Hayes et al. | 340/825.72 |
| 6,339,369 | B1 | * | 1/2002 | Paranjpe | 340/436 |
| 6,473,790 | B1 | * | 10/2002 | Tagi | 709/216 |
| 6,696,931 | B1 | * | 2/2004 | Paranjpe | 340/436 |

* cited by examiner

*Primary Examiner*—Joseph Feild
*Assistant Examiner*—S. Smith
(74) *Attorney, Agent, or Firm*—Staas & Halsey LLP

(57) ABSTRACT

Mobile communication apparatus, of small size and low cost, may be installed in vehicles to afford enhanced mobile-to-mobile communications between preceding and succeeding vehicles, even over a great distance therebetween. In the preceding vehicle, a detector detects a carrier transmitted from the succeeding vehicle and a transmission controller uses the carrier, when detected, for transmitting data to the succeeding vehicle. Further, the detector in the preceding vehicle detects, from the carrier transmitted from the succeeding vehicle, whether the distance to the succeeding vehicle is in a range permitting two-way communications therebetween. The transmission controller in the preceding vehicle transmits first information to the succeeding vehicle when the detector does not detect the possibility of two-way communication, and transmits second information to the succeeding vehicle when the detector detects the possibility of two-way communications with the succeeding vehicle.

16 Claims, 7 Drawing Sheets

MOBILE COMMUNICATION APPARATUS

BACKGROUND OF THE INVENTION

1. Field of the Invention

The present invention relates to mobile communication apparatus and, more particularly, to mobile communication apparatus of small size and low cost to be mounted in a vehicle, e.g., an automobile, car or truck also known more specifically as a road vehicle for affording radio communications with another such road vehicle.

2. Description of the Related Art

In existing digital radio communication apparatus to be mounted in a vehicle, two-way communication is conducted after determining the frequency (i.e., a "hand shake") to be used for radio communication between a preceding vehicle and a succeeding, or following vehicle (i.e., "mobile-to-mobile communication"). To conduct two-way communication after a hand-shake, both vehicles are required to have a carrier oscillator which is capable of selecting a single frequency from among a plurality of frequencies.

However, a vehicle is required to have a set of two communication apparatuses, one for communicating with a preceding vehicle and the other for communicating with a succeeding vehicle. Therefore, it is necessary to provide such apparatuses in a smaller size and at a lower cost, relatively to what is currently available.

Moreover, it is also desired, to ensure safer travel, that it be possible to transmit information from a preceding vehicle to a succeeding vehicle more reliably, over greater distances, than is currently achieved in mobile-to-mobile communication between such preceding and succeeding vehicles.

SUMMARY OF THE INVENTION

A mobile communication system, of low cost and small size, is provided in accordance with the invention by mounting, in the preceding vehicle, a discriminating unit which discriminates, or detects, a carrier transmitted from the succeeding vehicle and a transmission control unit which, in response to the discriminator detecting the carrier, transmits data using the detected carrier.

Moreover, the problem of realizing reliable transmission over a greater distance between a succeeding vehicle and a preceding vehicle can be solved by mounting, in the preceding vehicle, a discriminator which determines, from the carrier transmitted from the succeeding vehicle, whether or not the position of the succeeding vehicle is within a pre-established, or normal, range of two-way communication and a transmission control unit which transmits a first kind of information during times when the discriminator cannot detect the possibility of two-way communication, and transmits a second kind of information to the succeeding vehicle during times when the discriminator detects the possibility of two-way communication with the succeeding vehicle.

DESCRIPTION OF THE PREFERRED EMBODIMENTS

Figure 1:
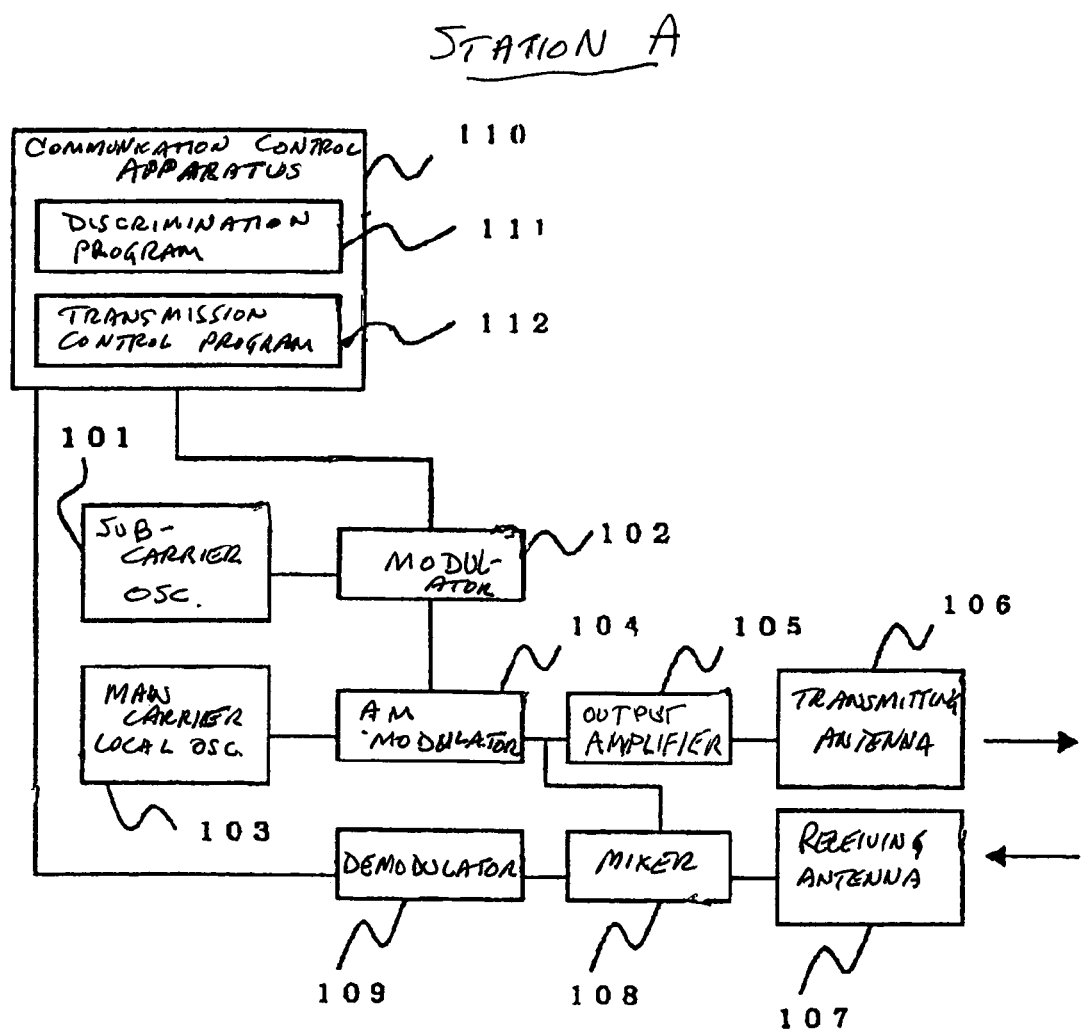
FIG. 1 is a block diagram of the communication apparatus of a succeeding vehicle (station A).
Figure 2:
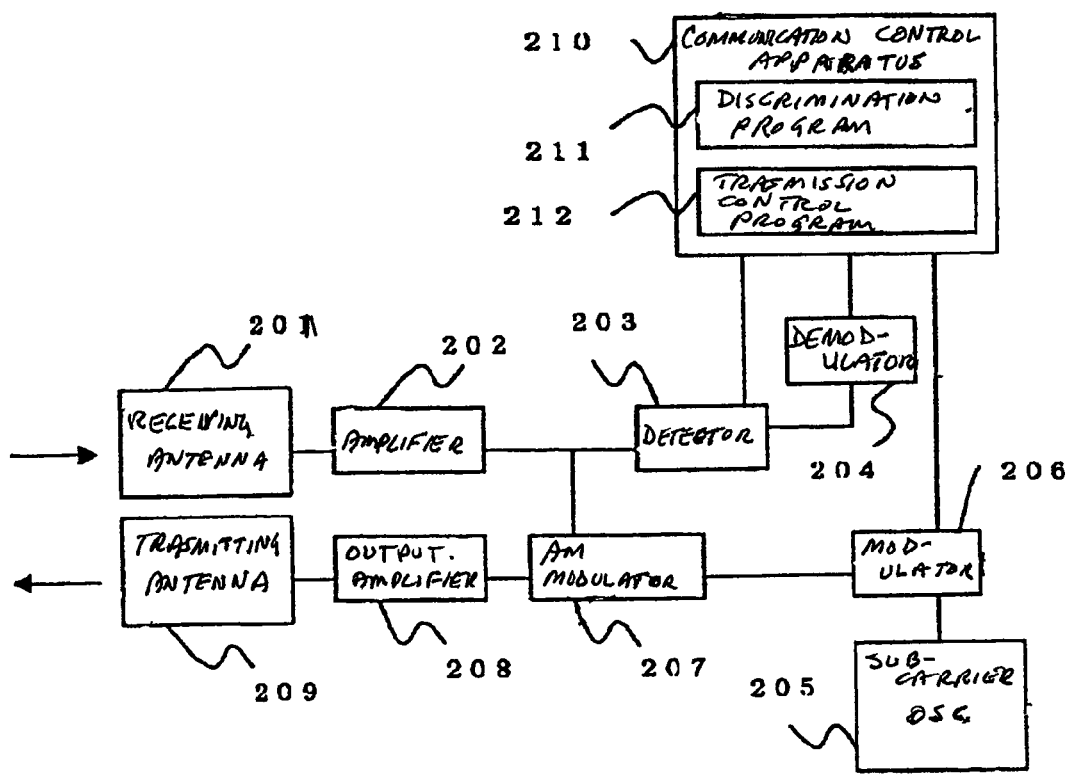
FIG. 2 is block diagram of the communication apparatus of a preceding vehicle (station B).

FIG. 1 is a block diagram of a mobile communication apparatus 110 for use in a succeeding vehicle (station A), i.e., a communication apparatus used for communicating with a preceding vehicle. FIG. 2 is a block diagram of a mobile communication apparatus 210 for use in a preceding vehicle (station B), i.e., a communication apparatus used for communicating with a succeeding vehicle.

In FIG. 1, on the occasion of transmitting information from the succeeding vehicle (station A), the sub-carrier signal obtained from a sub-carrier oscillator 101, based on the control of communication control apparatus 110, is modulated by a modulator 102 for producing a modulated wave which is then applied to an AM modulator 104 for the AM modulation of the main carrier signal, obtained from a carrier oscillator 103. The modulated main carrier signal then is amplified by output amplifier 105 and transmitted from a transmitting antenna 106.

Alternatively, in some cases as later discussed, the main carrier signal obtained from the carrier oscillator 103 is transmitted directly from the transmitting antenna 106, without the operation of the modulator 102, on the basis of the control afforded by the communication control apparatus 110.

In FIG. 2, on the occasion of transmitting information to the succeeding vehicle (station A) from the preceding vehicle (station B), a sub-carrier signal, obtained from a sub-carrier oscillator 205, is modulated with the information by a modulator 206, which supplies the modulated sub-carrier signal to an AM modulator 207. The main carrier signal received by the receiving antenna 201 from the succeeding vehicle (station A) is amplified by amplifier 202 and AM-modulated with the AM modulated sub-carrier signal by AM modulator 207. The AM-modulated main carrier signal then is amplified by output amplifier 208 and transmitted from the transmitting antenna 209.

Transmission of information embodied, or modulated, on the sub-carrier signal and which is used to modulate the main carrier signal, is performed on the basis of an instruction from the transmission control program 212, by discriminating content, obtained by detecting the main carrier received from the succeeding vehicle (station A) by detector 203, using a discrimination program 211 installed in the communication control apparatus 210.

For reception in the succeeding vehicle (station A), a homodyne system is preferably employed. With reference to FIG. 1, the main carrier signal received by a receiving antenna 107 and the main carrier signal from the AM modulator 104, explained previously, are mixed in a mixer 108 and are thereby detected. These detected signals are demodulated by a demodulator 109 and the recovered information is then sent to the communication control apparatus 110.

Figure 3:
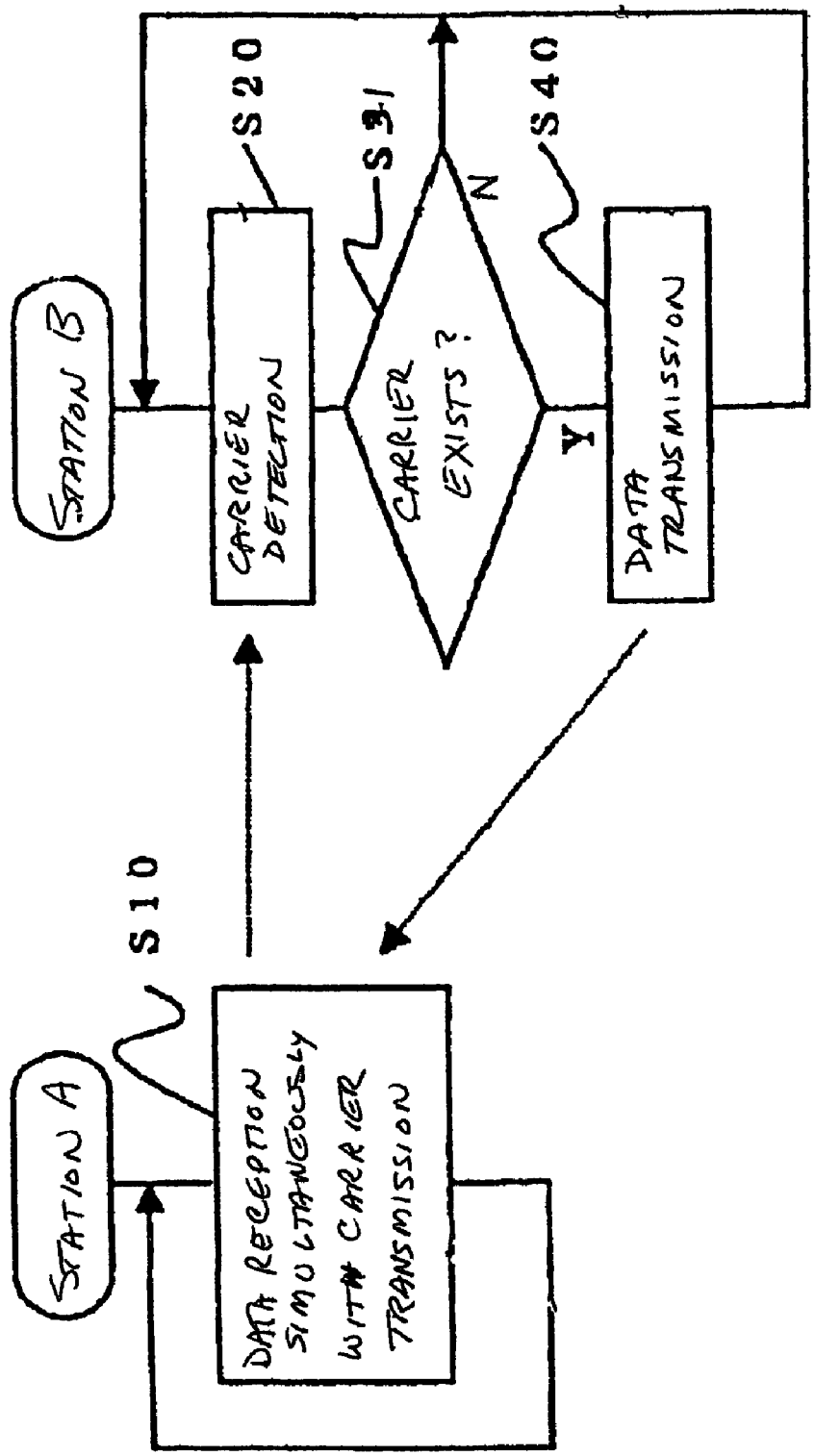
FIG. 3 is a flowchart of a transmission control process using detection of reception of a carrier as a control function.
Figure 4:
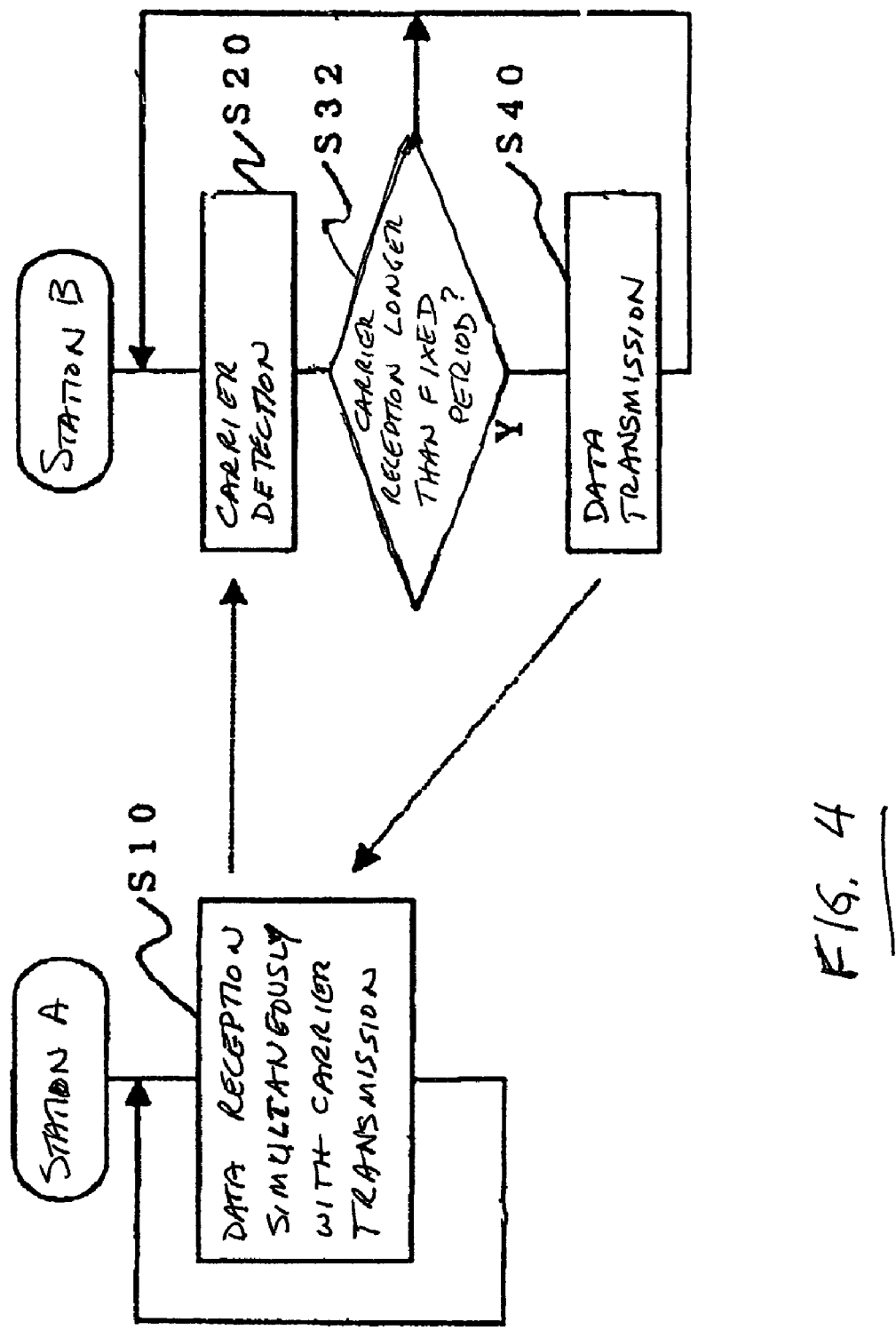
FIG. 4 is a flowchart of a transmission control process using detection of continuous reception of the received carrier for a predetermined time duration as a control function.
Figure 5:
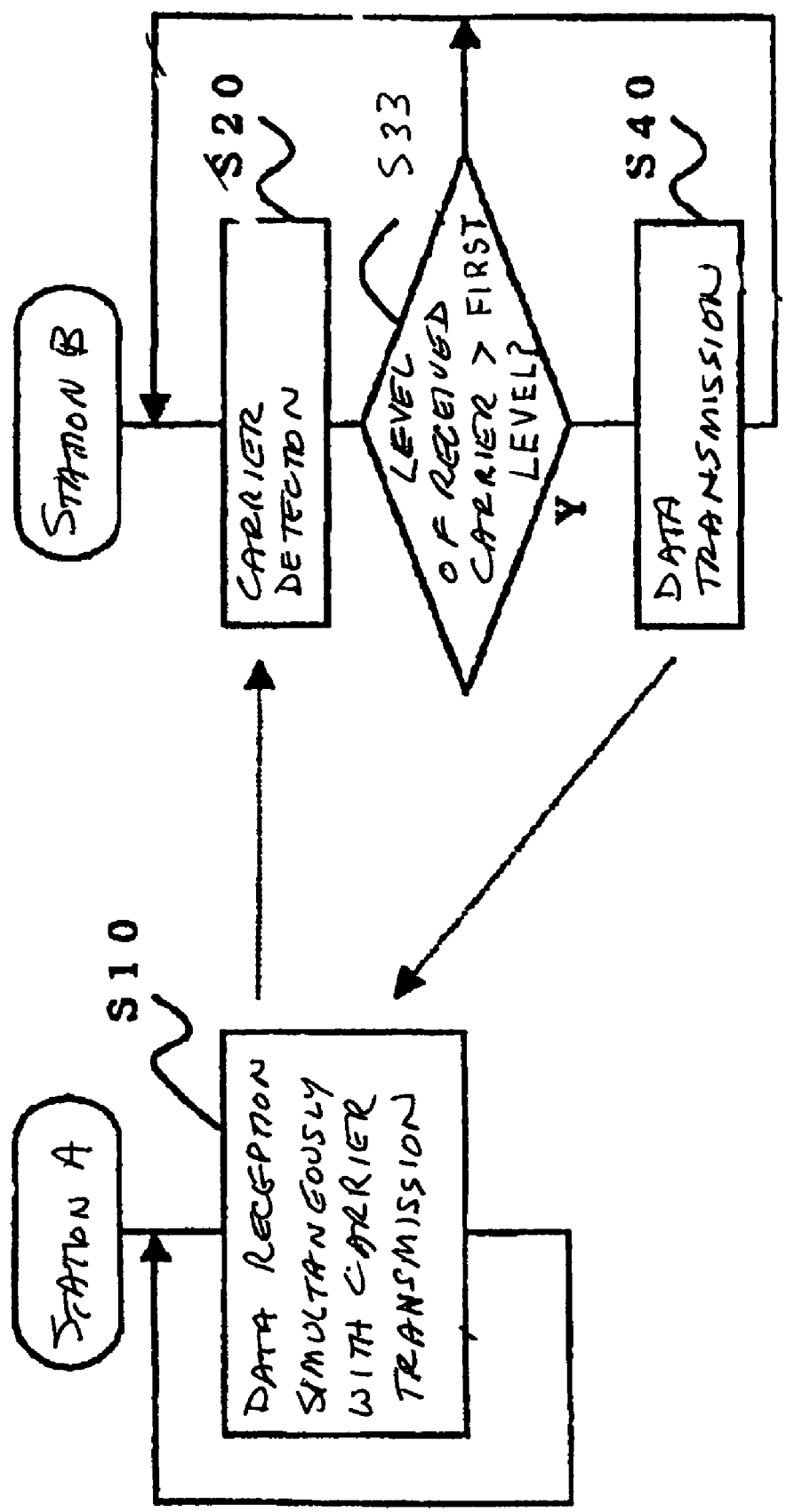
FIG. 5 is a flowchart of a transmission control process using detection of a specified signal level of the received carrier as a control function.

FIGS. 3–5 illustrate control content process flows of the communication control apparatus 110 of the succeeding vehicle (station A) and of the communication control apparatus 210 of the preceding vehicle (station B). In these flows, when the succeeding vehicle (station A) transmits the carrier signal and the preceding vehicle (station B) detects this carrier signal, the information held in the preceding vehicle (station B) is transmitted to the succeeding vehicle (station A), using the carrier signal received from the succeeding vehicle (station A).

In FIG. 3, the communication control apparatus 110 of the station A (the succeeding vehicle), to request information from the preceding vehicle, station B, controls a direct transmission of the main carrier signal, obtained from the carrier oscillator 103 and without operation of the modulator 102, via the transmitting antenna 106; it also waits for reception of the requested data, obtained by demodulating, using the demodulator 109, the signals which are received (S10) from the receiving antenna 107 and mixed in the mixer 108 for detection.

On the other hand, the communication control apparatus 210 (FIG. 2) of station B (the preceding vehicle) uses the discrimination program 211 to monitor (S20) the result of detection, by detector 203, of the main carrier signal after reception thereof by the receiving antenna 201, and discriminates (S31) whether or not the main carrier signal is detected. When the main carrier signal is detected, the transmission control program controls (S40) transmission of the information from the preceding vehicle to the succeeding vehicle.

Actual signal transmission is now explained with reference to FIG. 2. First, the modulator 206 is operated to modulate a sub-carrier signal obtained from the sub-carrier oscillator 205 and produce a modulated sub-carrier signal (i.e., a signal including the information to be transmitted) which is output by the modulator 206 and applied to the AM-modulator 207. Thereby, the main carrier signal from the succeeding vehicle (station A), received by the receiving antenna 201, is amplified by the amplifier 202 and then is AM-modulated with the AM modulated sub-carrier signal by modulator 207. The AM-modulated main carrier signal is then amplified by output amplifier 208 and transmitted from the transmitting antenna 209.

In FIG. 4, as in the case of FIG. 3, the communication control apparatus 110 of station A (the succeeding vehicle), to request information from the preceding vehicle, controls a direct transmission of the main carrier signal, obtained from the carrier oscillator 103 and without operation of the modulator 102, via the transmitting antenna 106; and simultaneously a signal transmitted from the preceding vehicle of station B is received (S10) at the succeeding vehicle of station A by the receiving antenna 107, the received signal is mixed in the mixer 108 for double detection and the data contained in the received signal is recovered by demodulating the double detected signal from mixer 108, using the demodulator 109 and the thus recovered data is supplied to the communication control apparatus 110.

The communication control apparatus 210 of station B (the preceding vehicle) uses the discrimination program 211 to monitor (S20) the result of detection by the detector 203, of a signal from the succeeding vehicle of station A, received at the receiving antenna 201 (FIG. 2), discriminates (S32) whether the detected carrier signal is continuous for at least a fixed period and, if so, controls (S40) the transmission of the data, or information, of the preceding vehicle to the succeeding vehicle in accordance with the transmission control program 212.

In FIG. 5, in the same manner as explained above, the communication control apparatus 110 of station A (the succeeding vehicle) controls a direct transmission of the main carrier signal obtained from the carrier oscillator 103 via the transmitting antenna 106, without operation of the modulator 102, to request information from the preceding vehicle; it also controls the mixing of the signal, received from station B at the receiving antenna 107, in the mixer 108 for double detection and the demodulation of same, using the demodulator 109, and receives the thus recovered data.

The communication control apparatus 210 of the station B (the preceding vehicle) monitors (S20) the result of detection of the main carrier by the detector 203, after reception of the main carrier from the receiving antenna 201, and, using the discrimination program 211, discriminates (S33) whether or not the signal level of the received, detected carrier is higher than a constant (first) level. When such a carrier is detected, the apparatus 210 controls transmission (S40) of the information of the preceding vehicle to the succeeding vehicle, using the transmission control program 212.

Figure 6:
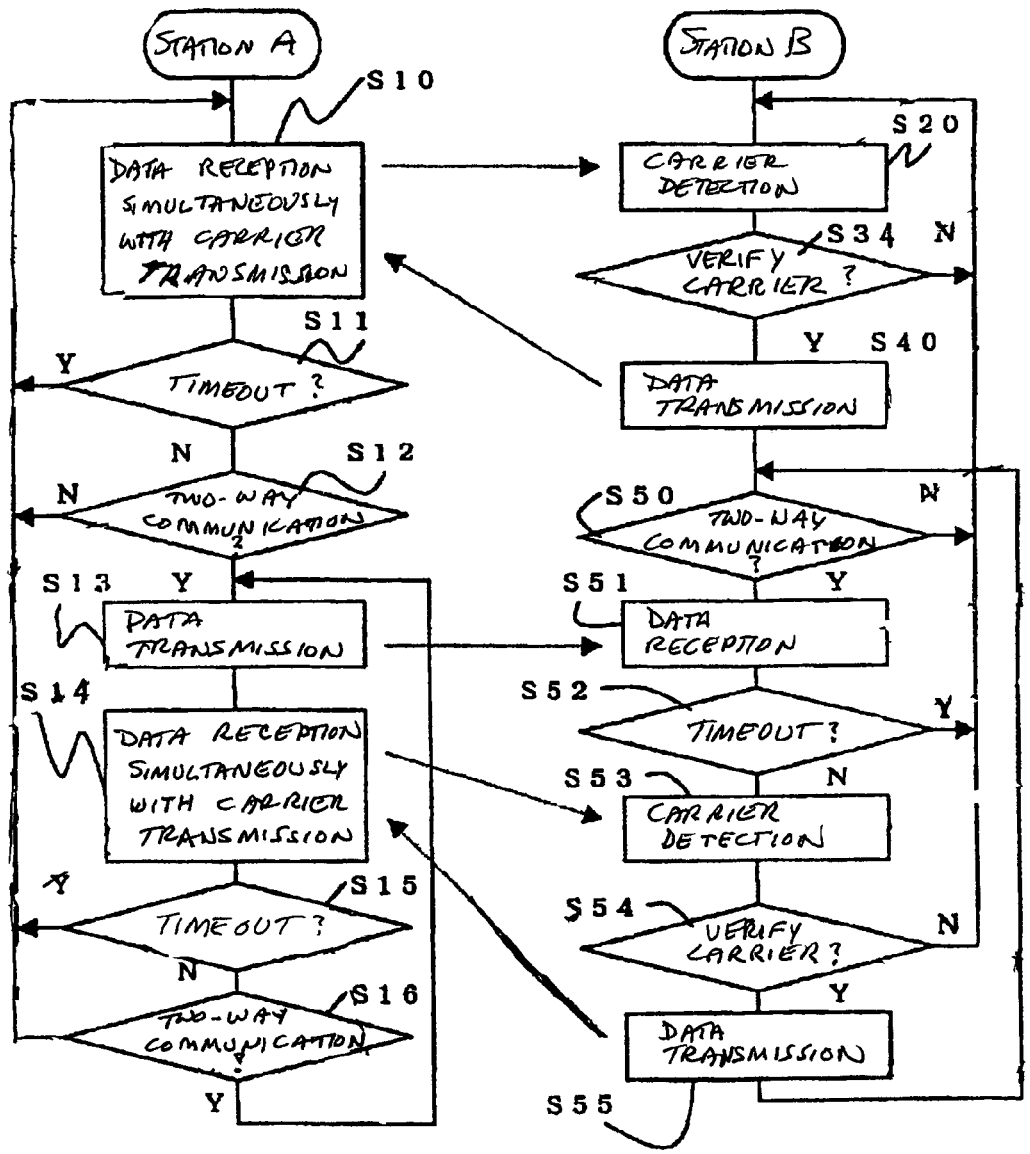
FIG. 6 is flowchart of one-way/two-way communication processing incorporating the control functions of FIGS. 3 through 5.

FIG. 6 is a processing flowchart of one-way/two-way communication and, more particularly, illustrates the control contents respectively of the communication control apparatus 110 of the succeeding vehicle (station A) and that of the communication control apparatus 210 of the preceding vehicle (station B), and of the processing flows which afford the function, when the succeeding vehicle (station A) transmits the carrier signal and the preceding vehicle (station B) detects this carrier signal, of transmitting the information stored in the preceding vehicle (station B) using the received carrier signal and also the function, when the succeeding vehicle (station A) comes within a predetermined range of distances relatively to the preceding vehicle (station B), of transmitting not only the information (data) from the preceding vehicle (station B) to the succeeding vehicle (station A) but also the information (data) from the succeeding vehicle (station A) to the preceding vehicle (station B)—i.e., two-way communication.

First, in the station A (the succeeding vehicle), the communication control apparatus 110 of station A controls, as in the case of FIGS. 3–5, the direct transmission of the main carrier, obtained from the carrier oscillator 103, via the transmitting antenna 106 and without operation of the modulator 102, to request information from the preceding vehicle and, also, for a signal received (S10) at the receiving antenna 107 from the station A, the mixing of the received signal by the mixer 108 for double detection and the demodulation of same by demodulator 109, the recovered data being received by the communication control apparatus 110. If the signal from the preceding vehicle of station B is not received (S11) at station A within the predetermined period, the process returns to step S10.

The received signal level information is included in the information of the signal received (S10) at station A from the station B, as the preceding vehicle, and the received signal level information is discriminated (S12) by the discrimination program 111. When the received signal level information indicates that two-way communication is possible, the transmission control program 212 controls transmission (S13) of the information of the succeeding vehicle of station A to the preceding vehicle of station B.

In step S13, the communication control apparatus 110 operates the modulator 102 of FIG. 1 to modulate the sub-carrier signal, obtained from the sub-carrier oscillator 101, in accordance with the information to be transmitted and applies this modulated wave to the AM modulator 104. Thereby, the main carrier signal, obtained from the carrier oscillator 103, is AM-modulated and is then transmitted from the transmitting antenna 106.

In two-way communication, to receive the data from the station B (the preceding vehicle) at the succeeding vehicle of station A, the carrier signal is transmitted (S14) as in the case of step S10. As in step S11, if the data signal from station B is not received by station A within the fixed period (S15), the process returns to step S10.

The received signal level information is included in the information received from the station B (the preceding vehicle) in step S14, and the discrimination program 111 discriminates the received signal level information (S16). When the received signal level is sufficient to enable two-way communication, the process returns to step S13; if the received signal level does not reach the level enabling two-way communication, the process returns to step S10.

Meanwhile, in the station B (the preceding vehicle) and as in the case of FIGS. 3–5, the communication control apparatus 210 monitors (S20) the result of detection, by the detector 203, of the signal received from the receiving antenna 201 of FIG. 2, discriminates (S34) whether the detected carrier satisfies the predetermined conditions indicated in FIGS. 3–5 and, when the predetermined conditions are satisfied, controls (S40), by the transmission control program 212, the transmission of the information stored in the preceding vehicle to the succeeding vehicle.

In this case, the information indicating that the level of the received carrier signal is higher than a first level, required to transmit information from the preceding vehicle to the succeeding vehicle, only, and whether or not it also satisfies the predetermined condition of being higher than a second level, higher than the first level, necessary to enable two-way communication is also transmitted to the succeeding vehicle.

Next, whether or not the received signal level is enough for two-way communications is discriminated by the discrimination program 211, thereby to receive (S51) the data from the succeeding vehicle. Namely, the signal detected by the detector 203 in FIG. 2 is demodulated by the demodulator 204 and the data obtained by demodulation is received (S51) by the communication control apparatus 210.

Whether or not the signal of the required level is received for the fixed period also is discriminated (S52). If the signal is not received for the fixed period, the process returns to step S20.

For station B to transmit the data to station A and as in the case of steps S20, S34, S40 of FIG. 6, at station B, the carrier transmitted from the station A (the succeeding vehicle) must be detected (S53). Whether or not the detected carrier satisfies the predetermined conditions illustrated in FIGS. 3–5 is discriminated (S54). When the predetermined conditions are satisfied, the control is executed so that the information stored in the preceding vehicle is transmitted to the succeeding vehicle (S55). Thereafter, the process returns to step S50.

In this case, the information indicating that the level of the received carrier is higher than a first level, required to transmit information from the preceding vehicle to the succeeding vehicle, only, and whether or not it also satisfies the predetermined condition of being higher than a second level, higher than the first level, necessary to enable two-way communication is also transmitted to the succeeding vehicle.

In the above explanation, when the succeeding vehicle is separated from the preceding vehicle by such a long distance that two-way communication is disabled, i.e., is not possible, the positional information of the preceding vehicle and the positional information of obstacles located in the path of the preceding vehicle are transmitted as the data offered (i.e., transmitted) to the succeeding vehicle from the preceding vehicle in step S40. But, such data is not highly accurate, or precise; for example, such data has an accuracy in units of several tens of meter (e.g.; a unit of at least 20 meters and hence 230 m, 240 m, etc. The continuous transmission frequency is rather low, resulting in the interval of about ⅒ sec. to 1 sec.

On the other hand, when the succeeding vehicle is separated from the preceding vehicle by only a short distance, within a range of distances within which two-way communication is possible, highly accurate positional information of the preceding vehicle and of obstacles in its path are transmitted from the preceding vehicle to the succeeding vehicle in step S55. This data has a resolution accuracy of 1 m or less. Moreover, when the succeeding vehicle follows the preceding vehicle by such a short distance, the information of the acceleration and deceleration of the preceding vehicle is incorporated into and transmitted with the data to the succeeding vehicle. In this case, a continuous transmission frequency is rather high, resulting in the interval of 10 msec. to 100 msec.

The data is transmitted to the preceding vehicle from the succeeding vehicle only when they are separated by a distance within a range in which two-way communication is possible, and which may be achieved automatically as a function of the signal (power) level. In this case, the information indicating the velocity of a succeeding vehicle, the existence of any obstacles in the path of travel thereof and information as to a running condition in which speed and direction of the succeeding vehicle are controlled automatically, based upon the preceding vehicle movement and not upon any control by the driver of the succeeding vehicle, are transmitted to the preceding vehicle from the succeeding vehicle.

Figure 7:
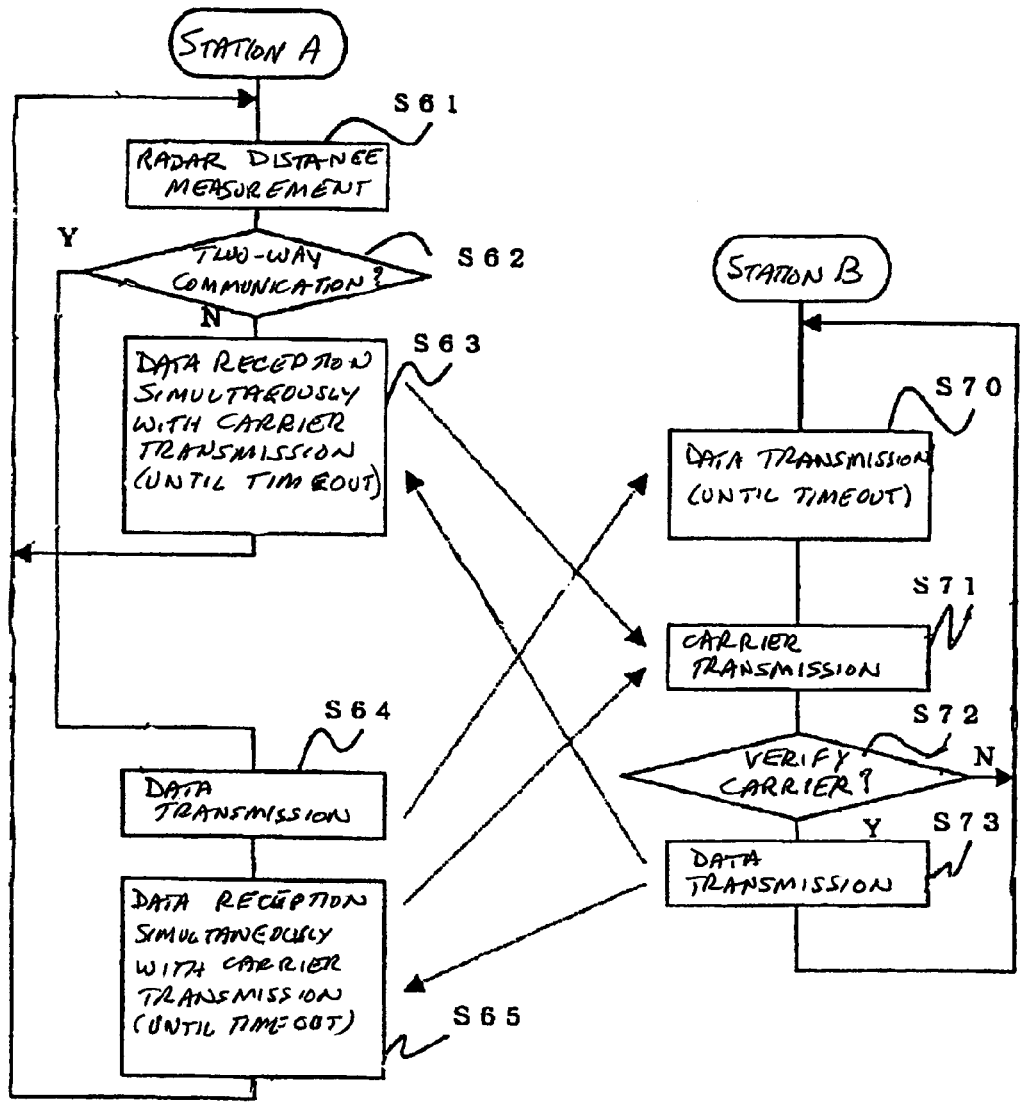
FIG. 7 is flowchart of one-way/two-way communication processing using radar distance measurement.

FIG. 7 illustrates a processing flow in a case of measuring the distance between preceding and succeeding vehicles by radar to determine whether or not two-way communication therebetween is possible.

The succeeding vehicle (station A) performs a measurement of the distance by radar (S61). The discrimination program 111 (FIG. 1) discriminates whether or not the measured distance allows two-way communication (S62). If two-way communication is impossible, the carrier is transmitted (S63) to the preceding vehicle (station B) for detection thereby (S71) and so as to achieve transmission of data from the preceding vehicle and thereby to receive the data transmitted from the preceding vehicle at the succeeding vehicle, with the transmission control program 112 reception simultaneously with carrier transmission (until time out).) The process returns to step S61.

When the measured distance allows two-way communication, the data is transmitted to the preceding vehicle from the succeeding vehicle by the transmission control program 112. (S62 and S64)

In view of receiving the data from the preceding vehicle, as the station B, in two-way communication, the data from the preceding vehicle is received, as in the case of step S63, by transmitting the carrier (S65). If the data is not received for the fixed period, the process returns to step S61.

Meanwhile, the preceding vehicle, as the station B, awaits receipt (S70) of the data from the succeeding vehicle. If data is not received within a fixed period, the carrier transmitted from the station A (the succeeding vehicle) is detected (S71) thereby to cause the preceding vehicle, of station B, to transmit the data to the station A, as the succeeding vehicle. At station B, whether or not the detected carrier satisfies the predetermined conditions illustrated in FIGS. 3–5 is discriminated (S72). When the predetermined conditions are satisfied, the preceding vehicle of station B is controlled to transmit (S73) the information thereof to the succeeding vehicle. The process then returns to step S70.

In this case, when the information transmitted (S64) from station A (as the succeeding vehicle) is received at station B in step S70, station B (the preceding vehicle) is in the two-way communication mode. Therefore, highly accurate, or precise, positional information of the preceding vehicle and also "highly accurate" positional information of any obstacles are transmitted at a fast rate, or frequently. In other cases where two-way communication is not possible, the information is, instead, of relatively lower accuracy, or precision, and is transmitted only infrequently.

Since the discriminating means for discriminating detection of a carrier, transmitted from the succeeding vehicle, and the transmission control means for transmitting data using the detected carrier, when the discriminating means has detected the carrier, are mounted in the preceding vehicle, a reduced price communication apparatus can be realized.

Moreover, since the discriminating means for discriminating, from the carrier transmitted from the succeeding vehicle, whether or not the position of a succeeding vehicle is within the range of two-way communication, the first transmission control means for transmitting the first kind of information, when the discriminating means does not discriminate the possibility of two-way communication, and the second transmission control means for transmitting the second kind of information to the succeeding vehicle, when the discriminating means discriminates possibility of two-way communications with the succeeding vehicle, are mounted in the preceding vehicle, transmission can be made over a longer distance between the preceding vehicle and the succeeding vehicle.

While the invention has been described in the foregoing with reference to specific embodiments, the description is not meant to be construed in a limiting sense. Various modifications of the disclosed embodiments, as well as other embodiments of the invention, will be apparent to persons skilled in the art based upon the description and related figures. It therefore is intended that the appended claims will cover any such modification or embodiments as fall within the true spirit and scope of the invention.

What is claimed is:

1. A mobile communications system providing, selectively, one-way and two-way communications between a preceding road vehicle and a succeeding road vehicle, comprising:
   in the succeeding road vehicle:
      a receiver receiving a carrier signal from the preceding road vehicle,
      a detector detecting whether a signal level of the carrier signal received from the preceding road vehicle is above a predetermined signal level and producing a corresponding detection output, and
      a communications controller, in response to the detection output of the detector, transmitting information on a modulated carrier signal to the preceding road vehicle; and
   in the preceding road vehicle:
      a detector detecting a carrier signal transmitted from the succeeding road vehicle and received by the preceding road vehicle and determining if communication is possible for the received and detected carrier signal and, if so, producing a corresponding carrier signal detection output, and
      a communications controller, in the absence of a carrier signal detection output from the detector indicating a detector determination that communication on the carrier is not possible, transmitting data to the succeeding terrestrial vehicle by one-way communication and, in response to the carrier signal detection output of the detector indicating a detector determination that communication on the carrier is possible, performing two-way communications between the succeeding and preceding terrestrial vehicles.

2. The mobile communication apparatus claimed in claim 1, wherein:
   the detector produces a carrier detection output indicating a detector determination that communication on the carrier is possible, in response to continuous detection of the carrier signal thereby for at least a fixed period of time.

3. The mobile communication apparatus as claimed in claim 1, wherein:
   the detector produces a carrier detection output indicating a detector determination that communication on the carrier is possible, when the signal level of the received carrier exceeds a predetermined level.

4. The mobile communications system of claim 1, wherein:
   information transmitted by the two-way communication has a higher accuracy than information transmitted by the one-way communication.

5. The mobile communications system of claim 1, wherein:
   a continuous transmission frequency of the two-way communication is higher than the continuous transmission frequency of the one-way communication.

6. The mobile communications system of claim 1, further comprising:
   a discriminator determining a distance between the preceding and succeeding road vehicles as a function of the detected signal level of the carrier signal.

7. The mobile communications system of claim 1, further comprising:
   a radar system detecting a predetermined distance between the preceding and succeeding road vehicles and producing a corresponding detection output enabling the two-way communications.

8. A mobile communications system as recited in claim 1, wherein:
   in each of the succeeding and preceding road vehicles, in response to the corresponding detection outputs of the respective detectors indicating detector determinations that communication on the respective carriers is possible, the respective communications controllers perform two-way communications between the succeeding and preceding road vehicles.

9. The mobile communication apparatus claimed in claim 8, wherein:
   the detector produces a carrier detection output in response to continuous detection of the carrier signal thereby for at least a fixed period of time.

10. The mobile communication apparatus as claimed in claim 8, wherein:

the detector produces a carrier detection output when the signal level of the received carrier exceeds a predetermined level.

11. The mobile communications system of claim 1, further comprising:
said communication controller in the preceding road vehicle transmits information indicating the operational status of the driver of the preceding road vehicle.

12. A mobile communications system providing, selectively, one-way and two-way communications between a preceding road vehicle and a succeeding road vehicle and comprising, in at least one of the succeeding and preceding road vehicles:
a detector detecting whether a condition for two-way communications between the preceding and succeeding road vehicles is satisfied, and producing a corresponding detection output; and
a communications controller, in the absence of a carrier signal detection output from the detector, transmitting data to the other of the succeeding and preceding road vehicles by a one-way communication and, in response to the carrier signal detection output of the detector, transmitting data in two-way communications to and from the other of the succeeding and preceding road vehicles.

13. The mobile communications system of claim 12, wherein:
information transmitted by the two-way communication has a higher accuracy than information transmitted by the one-way communication.

14. The mobile communications system of claim 12, wherein:
a continuous transmission frequency of the two-way communication is higher than the continuous transmission frequency of the one-way communication.

15. The mobile communications system of claim 12, wherein the detector comprises:
a discriminator determining a distance between the preceding and succeeding road vehicles as a function of the detected signal level of the carrier signal.

16. The mobile communications system of claim 12, further comprising:
a radar system detecting a predetermined distance between the preceding and succeeding road vehicles and producing a corresponding detection output enabling the two-way communications.

* * * * *